(12) United States Patent
Stoffel et al.

(10) Patent No.: US 9,992,930 B2
(45) Date of Patent: Jun. 12, 2018

(54) SLICING DISC MOWER KNIVES

(71) Applicants: Neal J. Stoffel, Campbellsport, WI (US); Keith A. Johnson, Kewaskum, WI (US)

(72) Inventors: Neal J. Stoffel, Campbellsport, WI (US); Keith A. Johnson, Kewaskum, WI (US)

(73) Assignee: Kondex Corporation, Lomira, WI (US)

(*) Notice: Subject to any disclaimer, the term of this patent is extended or adjusted under 35 U.S.C. 154(b) by 242 days.

(21) Appl. No.: 14/708,466

(22) Filed: May 11, 2015

(65) Prior Publication Data
US 2015/0319922 A1 Nov. 12, 2015

Related U.S. Application Data

(60) Provisional application No. 61/991,938, filed on May 12, 2014, provisional application No. 62/036,490, filed on Aug. 12, 2014.

(51) Int. Cl.
*A01D 34/73* (2006.01)
*A01D 34/66* (2006.01)
*A01D 34/81* (2006.01)

(52) U.S. Cl.
CPC ........... *A01D 34/73* (2013.01); *A01D 34/664* (2013.01); *A01D 34/733* (2013.01); *A01D 34/81* (2013.01)

(58) Field of Classification Search
CPC .... A01D 34/416; A01D 34/664; A01D 34/73; A01D 34/733; A01D 34/736; A01D 34/81; A01D 34/84
See application file for complete search history.

(56) References Cited

U.S. PATENT DOCUMENTS 2,529,797 A * 11/1950 Cauble ................. A01D 34/736
56/295
2,608,111 A * 8/1952 Ratkowski .............. E02F 9/285
37/460

(Continued)

FOREIGN PATENT DOCUMENTS

CN 202 085 483 U 12/2011
DE 20 2010 007 393 U1 11/2010

(Continued)

OTHER PUBLICATIONS

Harvesting Equipment—Blades for Agricultural Rotary Mowers—Requirements; International Standard ISO 5718; Jul. 15, 2002; 10 pages; First edition; Geneva, Switzerland.

(Continued)

*Primary Examiner* — Alicia Torres
*Assistant Examiner* — Adam J Behrens
(74) *Attorney, Agent, or Firm* — Reinhart Boerner Van Deuren P.C.

(57) ABSTRACT

A blade for a mower disc body is provided. The blade defines a central axis of rotation. The blade includes a blade body. The blade body is of a first hardness. The blade body has opposed top and bottom surfaces. An outer surface extends around the blade body vertically between the top and bottom surfaces. The blade body comprises first and second apertures or retainer structures in spaced apart relation. A cutting edge extends along an outer surface of the blade.

2 Claims, 8 Drawing Sheets

(56) References Cited

U.S. PATENT DOCUMENTS

| | | | |
|---|---|---|---|
| 2,896,317 A * | 7/1959 | Vaive | B67B 7/30 30/1.5 |
| 3,063,310 A | 11/1962 | Connoy | |
| 3,621,642 A * | 11/1971 | Leake | A01D 34/736 56/295 |
| 3,859,865 A | 1/1975 | Conrad | |
| 3,937,317 A | 2/1976 | Fleury, Jr. | |
| 3,944,443 A | 3/1976 | Jones | |
| 3,975,891 A | 8/1976 | Gunther | |
| 4,114,354 A * | 9/1978 | Morris | A01D 34/6806 56/295 |
| 4,126,985 A * | 11/1978 | Takahashi | A01D 34/685 56/13.6 |
| 4,416,656 A | 11/1983 | Shapiro | |
| 4,451,302 A | 5/1984 | Prescott et al. | |
| 4,466,533 A | 8/1984 | Shwayder | |
| 4,516,302 A | 5/1985 | Chulada et al. | |
| 4,530,204 A | 7/1985 | Brooks | |
| 4,645,404 A | 2/1987 | Juravic | |
| 4,660,361 A | 4/1987 | Remillard et al. | |
| 4,666,033 A | 5/1987 | Reid | |
| 4,730,445 A * | 3/1988 | Wolff | A01D 34/664 56/13.6 |
| 4,815,264 A * | 3/1989 | Mijnders | A01D 34/736 56/13.6 |
| 4,842,126 A | 6/1989 | McConnell | |
| 4,909,026 A | 3/1990 | Molzahn et al. | |
| 4,949,836 A | 8/1990 | Schostek | |
| 5,016,747 A | 5/1991 | Veenhof | |
| 5,092,453 A | 3/1992 | Bruke | |
| 5,181,461 A | 1/1993 | Viaud | |
| 5,209,053 A | 5/1993 | Verbeek | |
| 5,213,202 A | 5/1993 | Arnold | |
| 5,444,969 A | 8/1995 | Wagstaff et al. | |
| 5,673,618 A | 10/1997 | Little | |
| 5,823,449 A | 10/1998 | Kooima et al. | |
| 6,089,334 A | 7/2000 | Watts | |
| 6,155,705 A | 12/2000 | Douris et al. | |
| 6,402,438 B1 | 6/2002 | Boyer | |
| 6,543,211 B1 | 4/2003 | Talbot | |
| 6,594,975 B2 | 7/2003 | Anstey et al. | |
| 6,857,255 B1 | 2/2005 | Wilkey et al. | |
| 6,962,040 B2 | 11/2005 | Talbot | |
| 7,478,522 B1 | 1/2009 | Lovett et al. | |
| 7,677,843 B2 | 3/2010 | Techel et al. | |
| 7,827,883 B1 | 11/2010 | Cherng et al. | |
| 8,096,221 B2 | 1/2012 | Tarrerias | |
| 8,353,148 B2 | 1/2013 | Derscheid | |
| 8,464,506 B2 | 6/2013 | Schumacher et al. | |
| 8,484,938 B2 | 7/2013 | Cormier et al. | |
| 8,579,774 B2 | 11/2013 | Derscheid | |
| 8,662,131 B2 | 3/2014 | Cormier et al. | |
| 8,662,132 B2 | 3/2014 | Cormier et al. | |
| 8,714,053 B2 | 5/2014 | Krauter | |
| 2001/0004826 A1 | 6/2001 | Neuerburg | |
| 2002/0131328 A1 | 9/2002 | Bowens et al. | |
| 2003/0066391 A1 | 4/2003 | Griffo et al. | |
| 2003/0101706 A1 | 6/2003 | Kenny | |
| 2004/0093842 A1 * | 5/2004 | Cooper | A01D 34/736 56/295 |
| 2005/0193706 A1 * | 9/2005 | Thompson | A01D 34/736 56/255 |
| 2005/0241440 A1 | 11/2005 | Beck | |
| 2006/0168933 A1 * | 8/2006 | Hill, Jr. | A01D 34/73 56/295 |
| 2007/0074497 A1 * | 4/2007 | Myers | A01D 34/733 56/17.5 |
| 2007/0163128 A1 | 7/2007 | Tarrerias | |
| 2007/0261867 A1 * | 11/2007 | Techel | A01F 29/09 172/811 |
| 2008/0006016 A1 | 1/2008 | Snider et al. | |
| 2008/0078656 A1 | 4/2008 | Rhodea et al. | |
| 2009/0095214 A1 | 4/2009 | Whitfield | |
| 2009/0322143 A1 | 12/2009 | Krauter | |
| 2011/0009251 A1 | 1/2011 | Derscheid | |
| 2011/0067374 A1 | 3/2011 | James et al. | |
| 2012/0060379 A1 | 3/2012 | Culf | |
| 2012/0063871 A1 | 3/2012 | Wood | |
| 2012/0233974 A1 | 9/2012 | Cormier et al. | |
| 2012/0318114 A1 * | 12/2012 | Esain Eugui | A01D 34/733 83/651 |
| 2013/0032047 A1 | 2/2013 | Marques et al. | |
| 2013/0111863 A1 * | 5/2013 | Johnson | A01D 34/736 56/10.1 |
| 2013/0233145 A1 | 9/2013 | Sotelo et al. | |
| 2013/0327008 A1 | 12/2013 | Eavenson, Sr. et al. | |
| 2014/0041537 A1 | 2/2014 | Hubach et al. | |
| 2014/0045562 A1 * | 2/2014 | Adamczyk | A01F 29/02 460/112 |
| 2014/0130473 A1 * | 5/2014 | Augustine | A01D 34/73 56/16.7 |
| 2014/0215787 A1 | 8/2014 | Wada et al. | |
| 2014/0230394 A1 | 8/2014 | Zerbarini | |
| 2015/0319922 A1 | 11/2015 | Stoffel et al. | |
| 2016/0021817 A1 * | 1/2016 | Rojas | A01D 34/733 56/295 |
| 2016/0044866 A1 * | 2/2016 | Nelson | A01D 34/733 56/255 |
| 2016/0157423 A1 | 6/2016 | Stoffel et al. | |
| 2016/0360695 A1 * | 12/2016 | Klackensjo | A01D 34/73 |

FOREIGN PATENT DOCUMENTS

| | | |
|---|---|---|
| EP | 0462484 A2 | 12/1991 |
| EP | 2 200 914 | 3/2009 |
| EP | 2 371 205 A1 | 10/2011 |
| EP | 2 499 896 A1 | 9/2012 |
| JP | 7-24986 | 6/1995 |
| JP | 3382730 B2 | 3/2003 |
| JP | 2006020531 A | 1/2006 |
| JP | 2009011223 A | 1/2009 |
| JP | 2009126608 A | 6/2009 |
| KR | 101317832 B1 | 10/2013 |
| RU | 2555268 C2 | 7/2015 |
| WO | WO 90/14755 A1 | 12/1990 |
| WO | WO 2014171656 A1 * | 10/2014 ............ A01D 34/828 |

OTHER PUBLICATIONS

Hyungson Ki et al.; Process map for laser heat treatment of carbon steels; Optics & Laser Technology; 2012, 9 pages. (2106-2114) vol. 44.

Sangwoo So et al.; Effect of specimen thickness on heat treatability in laser transformation hardening; International Journal of Heat and Mass Transfer; 2013; 11 pages (266-276); vol. 61.

U.S. Appl. No. 14/708,649, filed May 11, 2015, Stoffel et al.

* cited by examiner

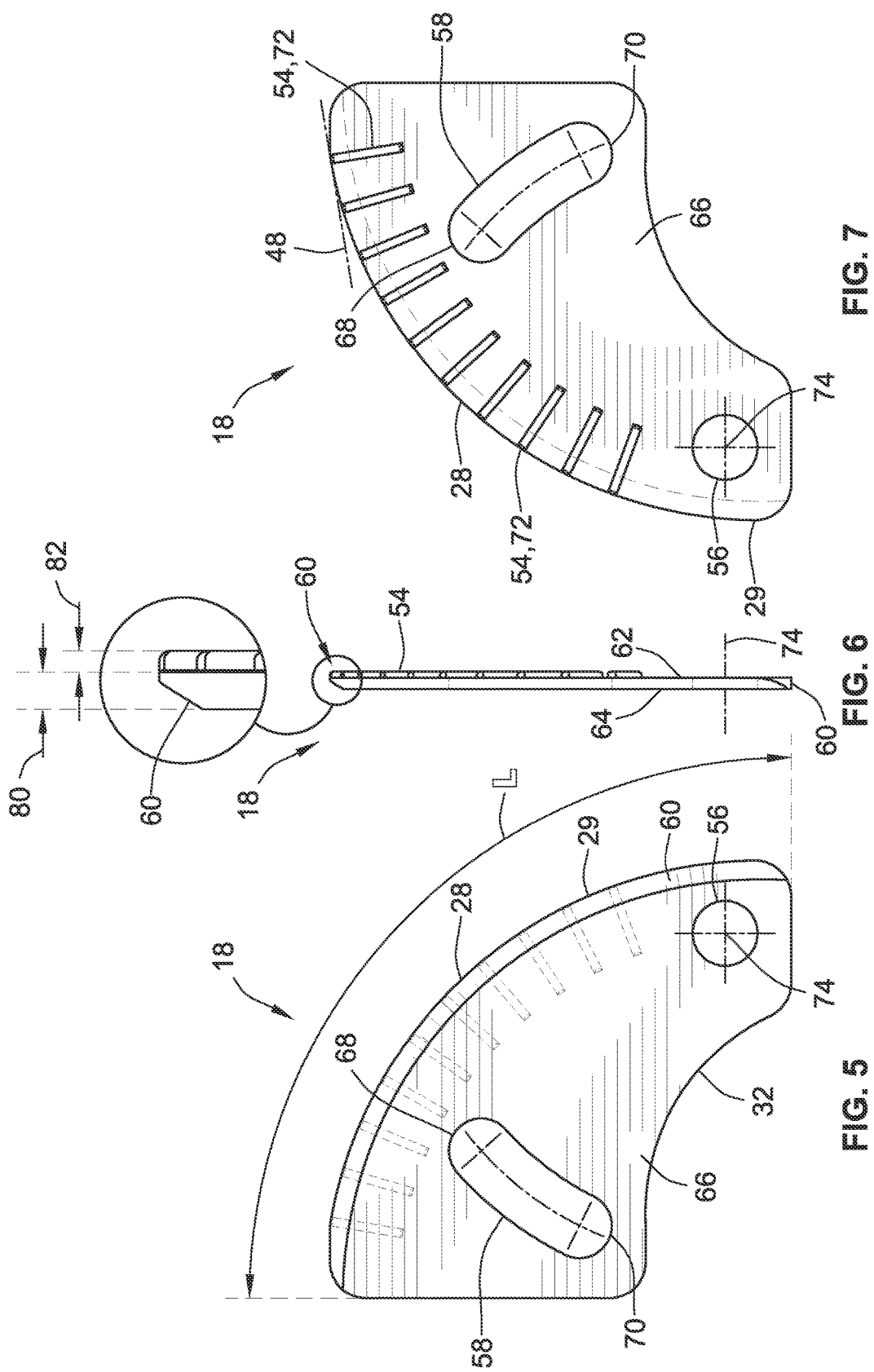

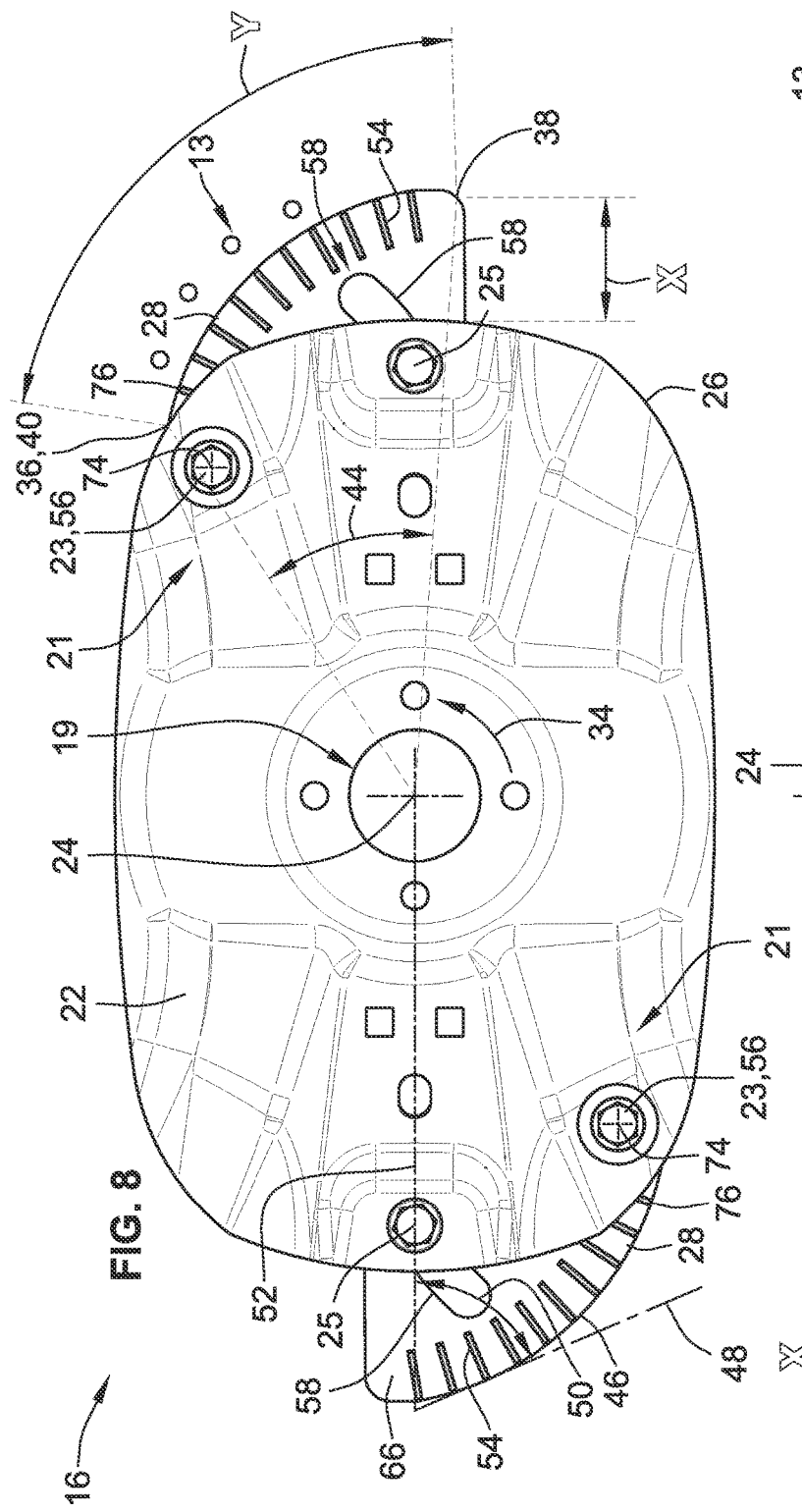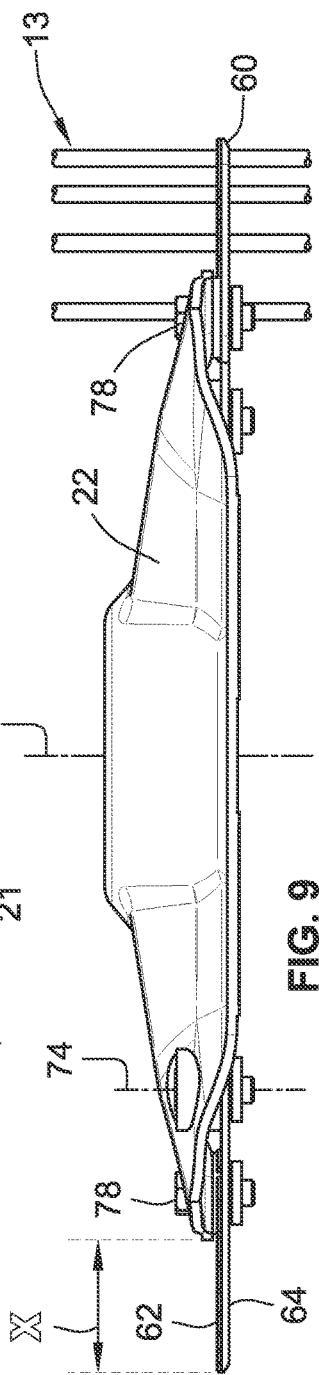

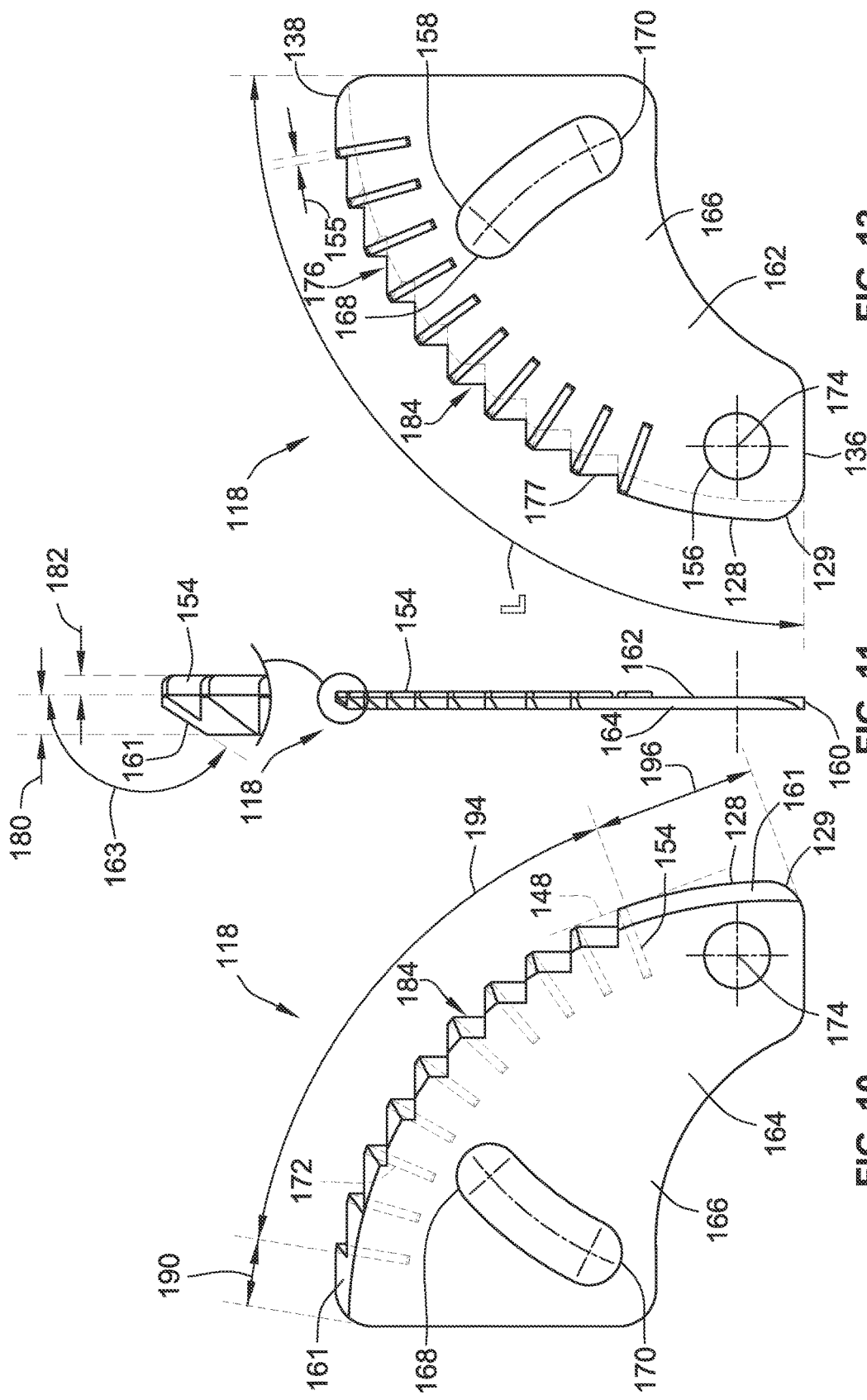

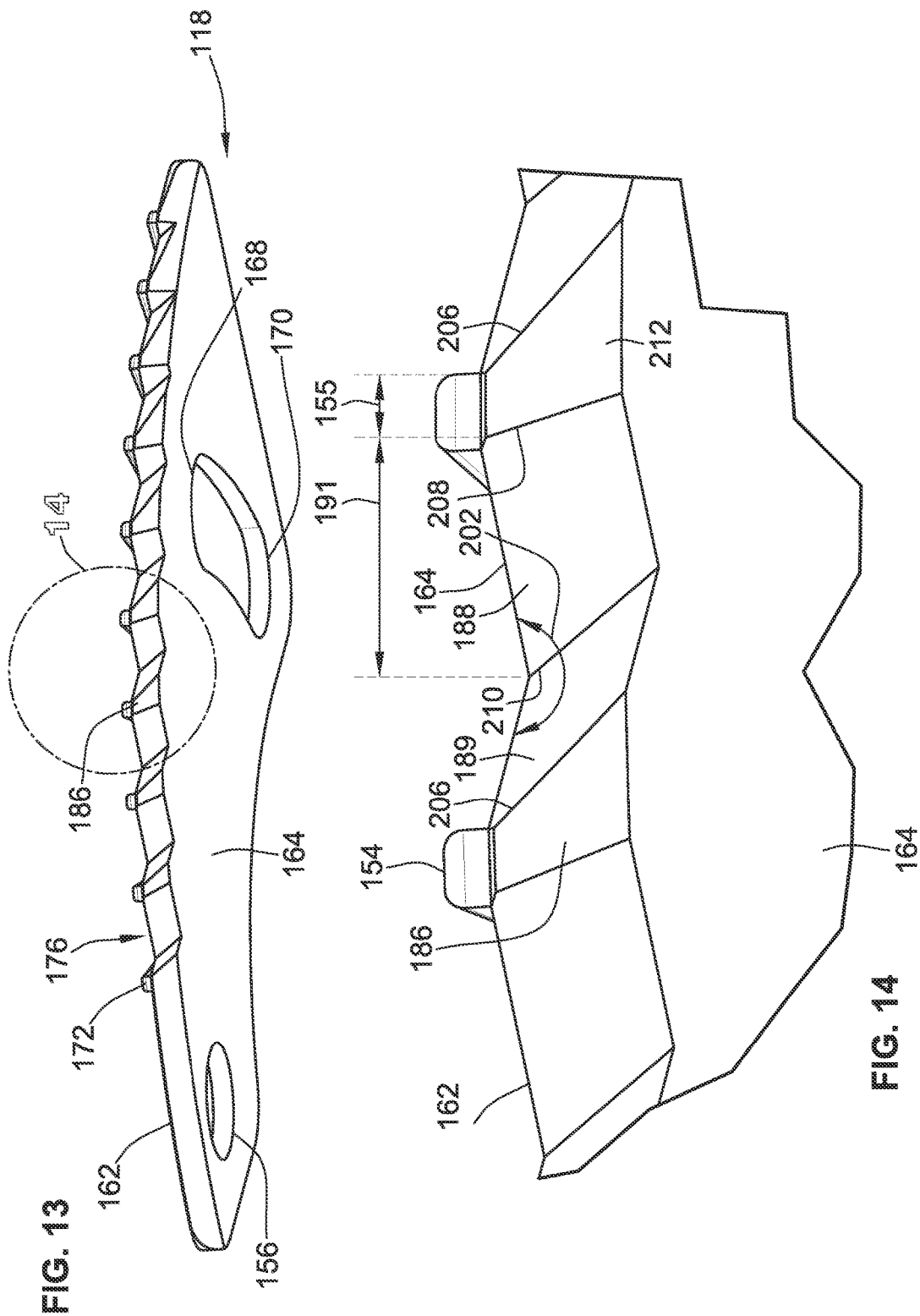

SLICING DISC MOWER KNIVES

CROSS-REFERENCE TO RELATED PATENT APPLICATIONS

This patent application claims the benefit of U.S. Provisional Patent Application No. 61/991,938, filed May 12, 2014, and U.S. Provisional Patent Application No. 62/036,490, filed Aug. 12, 2014, the entire teachings and disclosure of which are incorporated herein by reference thereto.

FIELD OF THE INVENTION

This invention generally relates to mower disc blades (also referred to as knives).

BACKGROUND OF THE INVENTION

Disc mowing machines are utilized to cut a crop while moving through a stand of the crop. Examples of such machines are shown for example in U.S. Patent Application Publication No. 2013/0111863. The disc mowing machines may be either self-propelled or pulled, for example, by a tractor.

As disclosed in the '863 publication, current disc mowing machines cut agricultural material using a severing blade that is rectangular in shape with a mounting hole toward one end of the blade. The severing blade is rotatably mounted to a plurality of rotating mower discs. The portion of the blade away from the mounting portion has a beveled edge and this portion of the blade impacts and cuts the crop as the disc rotates.

There are problems associated with current disc mower machines. They require a large amount of power to rotate their discs and drive the rectangular blades through the crops. The cutting of the crop itself is not a large percentage of the total power required, but any reduction in power used is beneficial. Ideally, if the crop can be cut more efficiently, the amount of fuel used can be reduced.

Additionally, the use of the rectangular blades in operation is problematic because in operation, they frequently contact small stones and rocks in the field. At impact the stones are hurled into the air at tremendous velocities. Though there are guards and shields in place they are not always effective at preventing the projectiles from impacting the machine operator or bystanders.

Furthermore, the rectangular blades of current designs become dull almost immediately upon use and impact with the crop. The blades wear out beyond usefulness in a fairly short time span depending on field conditions. Such wear leads to increased expenses and increased time for maintenance to repair and or replace the worn blades.

The invention provides a mower disc blade to address one or more of the foregoing problems with known mower disc blades. These and other advantages of the invention, as well as additional inventive features, will be apparent from the description of the invention provided herein.

BRIEF SUMMARY OF THE INVENTION

In one aspect, the invention provides a blade for a mower disc body that defines a central axis of rotation. The blade includes a blade body of a first hardness. The blade body has opposed top and bottom surfaces and includes an outer surface that extends around the blade body vertically between the top and bottom surfaces. The blade body includes first and second apertures or retainer structures in spaced apart relation. A cutting edge extends along an outer surface of the blade.

In another aspect, the invention provides a blade for a mower disc body. The blade comprises a blade body of a first hardness. The blade body has opposed top and bottom surfaces and comprises an outer surface extending around the blade body vertically between the top and bottom surfaces. The blade further comprises a first and a second blade body retainer. A cutting edge extends along the outer surface of the blade. The top surface comprises a plurality of hardened beads spaced apart and of a second hardness greater than the first hardness. The hardened beads are arranged adjacent to the cutting edge and extend toward the outer surface.

In yet another aspect, the invention provides at least one blade for a mower disc body. The mower disc body is adapted to rotate about a central axis. The mower disc body includes an outer periphery. The at least one blade includes a blade body. The at least one blade is configured such that when it is mounted to the disc mower body the blade body extends radially outward from the outer periphery an X radial distance. The at least one blade has a cutting edge that extends along a length of a Y distance from a leading end to a trailing end. The Y distance is more than 1.5 times as great as the X radial distance.

In still another aspect, the invention provides a mower disc assembly. A mower disc body is adapted to rotate about a central axis of the mower disc body. The mower disc body includes an outer periphery. Two blades are mounted to the disc mower body in diagonally opposed space relation. Each of the blades comprises a hinge retainer that allows articulating movement of the blade and a slide retainer. The slide retainer is disposed at a location trailing the first hinge. Each of the blades has movement limited by the slide retainer between a first stop and a second stop.

In still yet another aspect, the invention provides a mowing machine for slicing crops. The mowing machine includes a blade for a mower disc body that defines a central axis of rotation. The blade includes a blade body of a first hardness. The blade body has opposed top and bottom surfaces and includes an outer surface that extends around the blade body vertically between the top and bottom surfaces. The blade body includes first and second apertures or retainer structures in spaced apart relation. A cutting edge extends along an outer surface of the blade.

In an embodiment the cutting edge extends from a leading location to a trailing location relative to the central axis and predetermined rotational movement for the blade. The leading location and the trailing location are separated by an angular distance of at least 120 degrees. In a more preferred embodiment the angular distance may be at least 30 degrees with the leading location and the trailing location separated between 5 and 25 centimeters.

In another embodiment the first and second apertures or retainer structures comprise a mounting aperture or other hinge retainer structure that defines a blade body axis of rotation for pivoting movement. The blade body defines an elongated slot or other slide retainer structure that defines a first stop and second stop adapted to limit pivoting movement of the blade body.

In an embodiment the Y distance is more than 1.5 times as great as the X radial distance. The cutting edge extends a distance of between 5 and 25 centimeters.

In an embodiment the cutting edge includes a curved portion that defines a tangent that defines an acute angle greater than 45 degrees with a radial extension extending from the central axis of rotation.

In an embodiment the cutting edge may be convex and faces away from the mower disc body.

In an embodiment the top surface of the blade body comprises a plurality of hardened beads spaced apart and of a second hardness greater than the first hardness. The hardened beads comprise laser clad material deposited along an extension radially inward and perpendicular or within 45 degrees of perpendicular to a tangent along the convex cutting edge.

In one embodiment the blade body may include a tapered cutting face formed into the bottom side and intersecting the cutting edge. The tapered cutting face may be sandwiched between the top surface and a bottom surface of the blade body and extend radially inward from the top surface to the bottom surface.

In an embodiment the blade includes a mounting structure adapted to mount the blade to the mower disc body.

In an embodiment the cutting edge may be formed along the top surface.

In an embodiment the blade body comprises a sheet steel formed component having a material thickness that is substantially uniform.

In an embodiment the hardened beads are 10 to 30% the thickness of the material thickness. The first hardness is between HV 400 and 650 in the Vickers scale hardness. The hardened beads comprise at least one of the materials comprising: tungsten carbide, chrome carbide, iron carbide, ceramic, and other material having a Vickers scale hardness between HV 700 to 1400.

In an embodiment the blade body comprises a mounting aperture or other hinge retainer that defines a blade body axis of rotation for pivoting movement. The blade body defines an elongated slot or other slide retainer that defines a first stop and second stop that limits the pivoting movement of the blade body.

In an embodiment the cutting edge extends along a trailing path from a leading location to a trailing location relative a predetermined axis of rotation defined by the mower disc body when the blade is mounted to the mower disc body. The blade body may include a leading hardened bead and a plurality trailing hardened beads. The trailing hardened beads may be located in a series trailing the leading location.

In preferred embodiment the Y distance is more than 2 times as great as the X radial distance.

In a more preferred embodiment the Y distance is more than 2.5 times as great as the X radial distance.

In an embodiment the mower body may rotate in a first direction about the central axis of rotation and the blade body may simultaneously be able to rotate about a first hinge axis of rotation in a second and opposite direction of the first direction.

In an embodiment the mower disc body may include a mounting location for a drive unit. The mounting location may define the center axis of rotation of the mower disc body. The two blade mounting portions are in opposed space relation. Each blade mounting portion may include a first and second blade mounting location.

In an embodiment the first and second blade mounting locations of the mower disc body may be apertures. The hinge retainer of the mower disc blade may be an aperture. The slide retainer of the mower disc blade may be a slotted aperture. Each of the blades may be mounted to the mower disc body with fasteners. One the fastener may be inserted through the first aperture of the blade mounting location and the hinge retainer aperture. The other of the fasteners may be inserted through the second blade mounting location aperture and the slotted aperture.

In an embodiment the mowing machine may include a drive unit. A rotary cutter bar may be operably coupled to the drive unit such that the drive unit drives the rotary cutter bar. At least one mower disc assembly is operably connected to the rotary cutting bar. The at least one mower disc assembly is configured to rotate about a central axis of the mower disc assembly.

In still another aspect, the invention provides a method for slicing crops. The method comprises providing a machine to move through the crop. The machine comprises at least one mower disc assembly configured to rotate about a central axis of a mower disc body of the mower disc assembly.

In an embodiment, the method may include providing at least two blades for mounting to a mower disc body. Each blade may include a blade body of a first hardness. The blade body has opposed top and bottom surfaces and comprises an outer surface extending around the blade body vertically between the top and bottom surfaces. The blade body comprises first and second apertures or retainer structures in spaced apart relation and a cutting edge extending along an outer surface of the blade.

In an embodiment, the method may include mounting the at least two blades to the mower disc body in opposed space relation.

In certain embodiments, the method step for providing the at least two blades further includes the step of depositing a plurality of hardened beads along the top surface of each blade. The hardened beads may be spaced apart and of a second hardness greater than the first hardness. Each blade when mounted to the mower disc body may extend radially outward from a mower body outer periphery an X radial distance. The cutting edge of each blade extends along a length of a Y distance from a leading end of each blade to a trailing end of each blade. The Y distance is more than 1.5 times as great as the X radial distance.

In yet another embodiment, the cutting edge may include a leading edge portion, a center edge portion and a trailing edge portion. The center edge portion may include graduated cutting teeth.

Each graduated cutting tooth may include a tip face, a relief face and a beveled cutting face arranged to create a step in the cutting edge and thereby make the cutting edge discontinuous along the outer surface. The relief face may extend transverse and inward away from an outermost periphery of the cutting edge to create the step. The tip face may be located at the outermost periphery of the cutting edge. The beveled cutting face may extend transversely between the tip face and the relief face. Each relief face may extend from either the leading edge portion or one tip face of an upstream graduated cutting tooth.

The graduating cutting teeth may be located in the center edge portion, and the beveled cutting edges get shorter and the relief faces get longer the farther the graduated cutting teeth are from the leading portion. The graduated cutting teeth are sharpened to have a segmented cutting surface.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 5 is a bottom view of a the blade employed in the mower disc assembly of FIG. 4;

FIG. 6 is a side view of the blade of FIG. 5;

FIG. 7 is a top view of the blade of FIG. 5;

FIG. 8 is a top view of the mower disc assembly of FIG. 4;

FIG. 9 is a side elevation view of the mower disc assembly of FIG. 4;

FIG. 10 is a bottom view of a blade employed in the mower disc assembly of FIG. 4

FIG. 11 is a side view of the blade of FIG. 10;

FIG. 12 is a top view of the blade of FIG. 10;

FIG. 13 is a perspective view of the graduated cutting teeth of FIG. 10; and

FIG. 14 is an exploded partial perspective view of the cutting teeth of FIG. 13.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
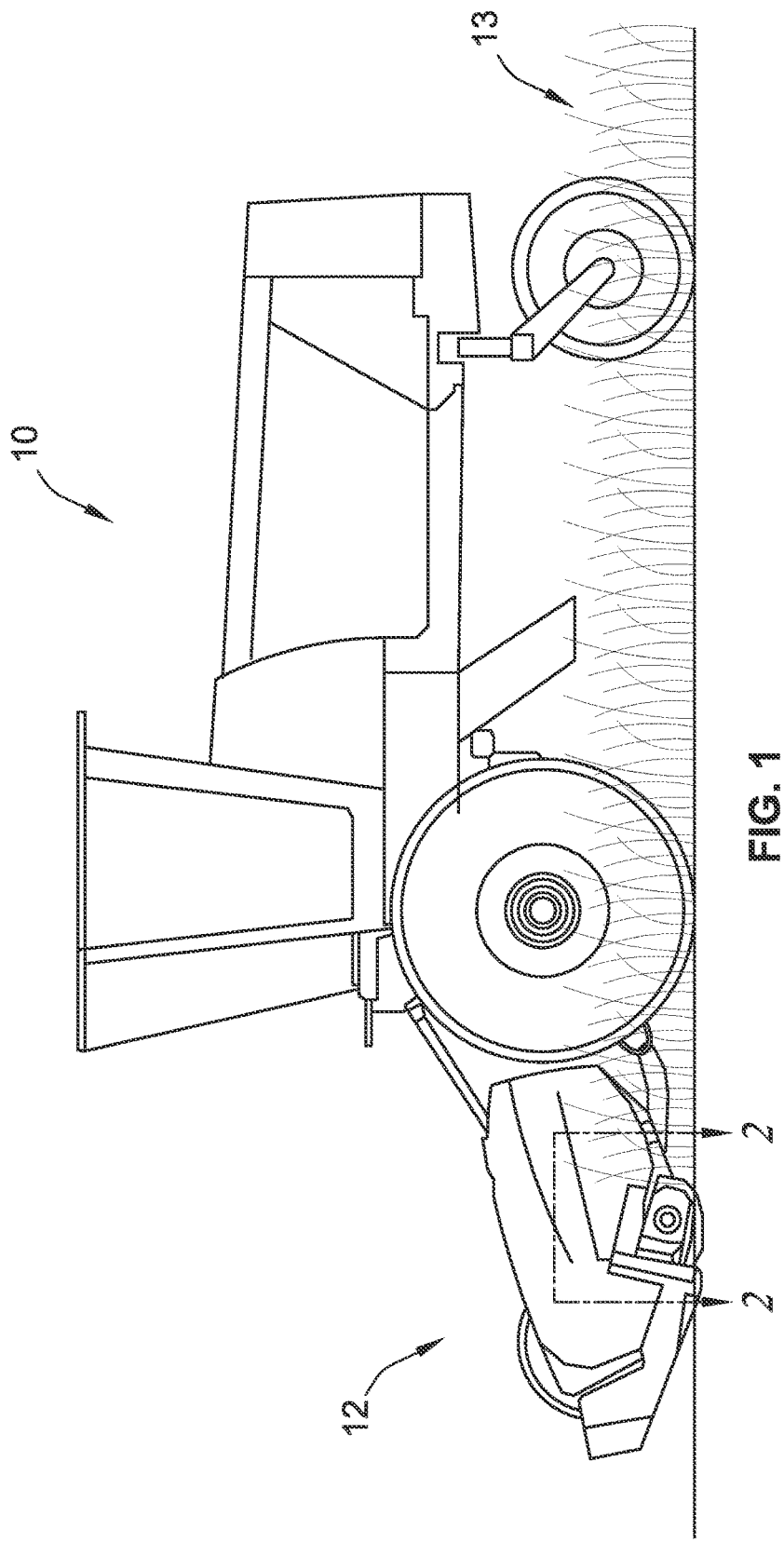
FIG. 1 is an illustration of a tractor pulling a mowing machine.

FIG. 1 illustrates a tractor 10 pulling a mowing machine 12 through a stand of crop 13. The mowing machine 12 may either be self-propelled or as shown here pulled and powered by the tractor 10.

Figure 2:
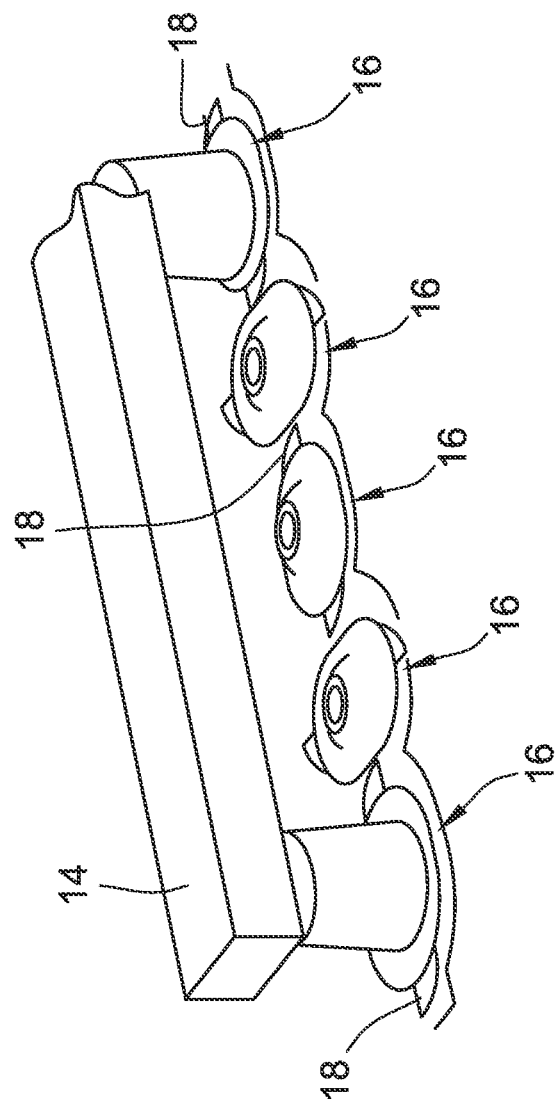
FIG. 2 is a partly schematic isometric illustration of a disc mower cutter bar including a plurality of discs holding a plurality of mower blades.

FIG. 2 illustrates a mower disc cutter bar 14 that forms a part of the mowing machine 12 shown in FIG. 1. The mower disc cutter bar 14 supports a plurality of mower disc assemblies 16, which in turn support a plurality of mower disc blades 18 (also known as cutter blades and/or knives).

Figure 3:
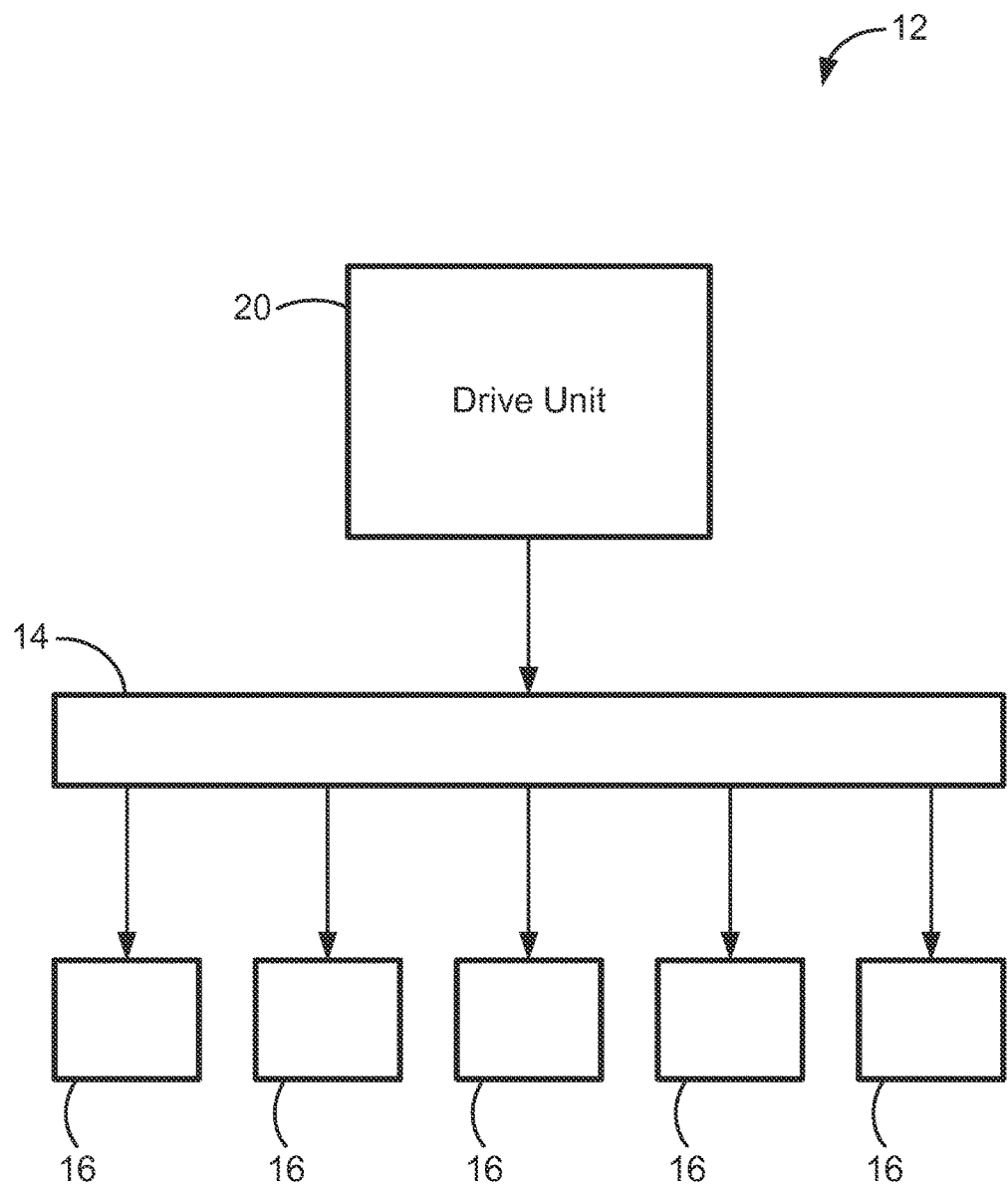
FIG. 3 is a schematic view of a mowing machine.

FIG. 3 illustrates a schematic view of a mowing machine 12. The mowing machine 12 includes a drive unit 20 for driving a rotary cutter bar 14. The rotary cutter bar 14 includes a plurality of mower disc assemblies 16 that each contain a plurality of slicing disc mower blades 18 (see FIG. 2). While the mowing machine 12 is illustrated as including a plurality of mower disc assemblies 16, it is contemplated that as few as one mower disc assembly 16 could be employed in certain applications.

Figure 4:
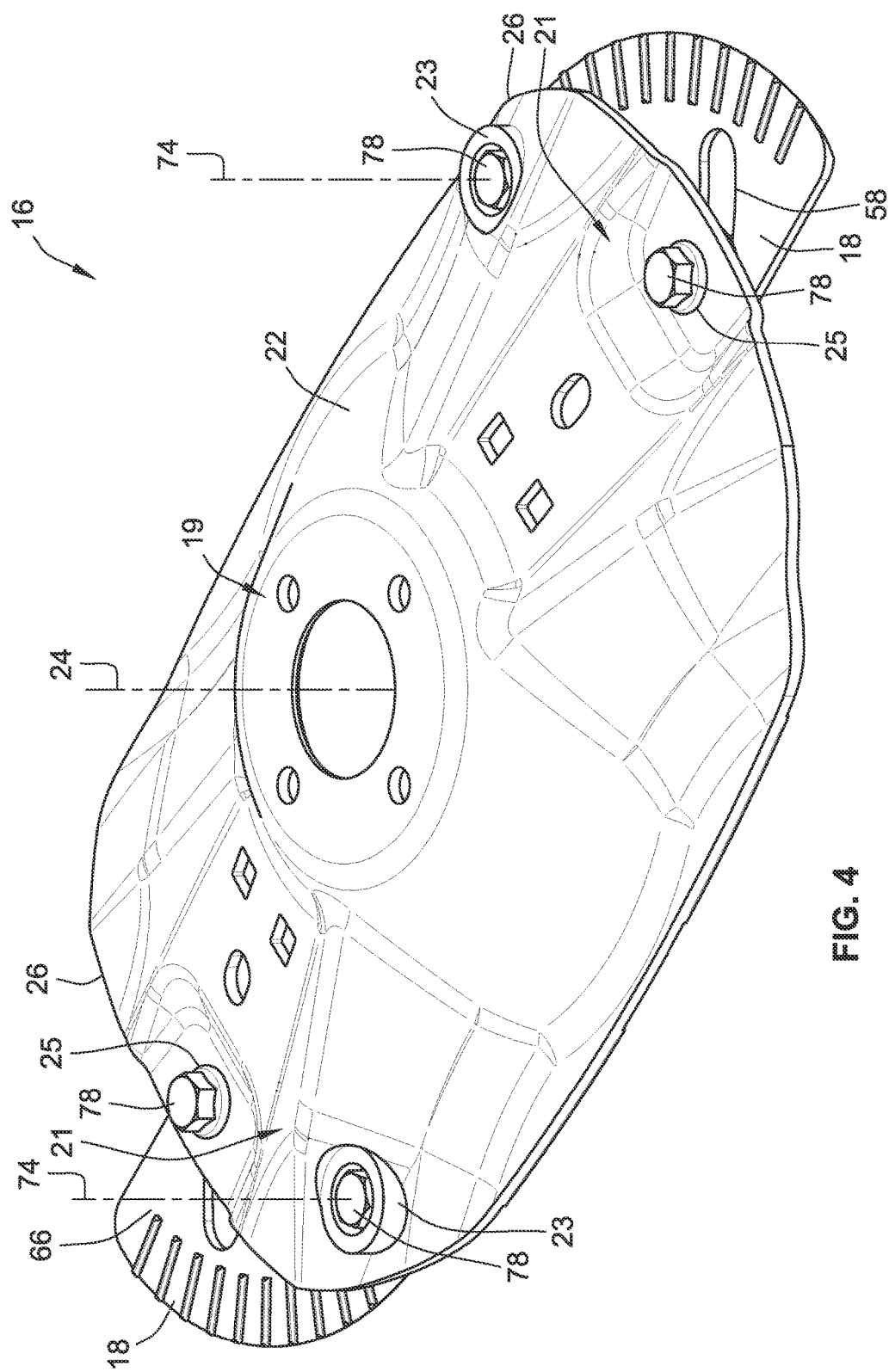
FIG. 4 is an isometric view of a mower disc assembly.

FIG. 4 illustrates an isometric view of a mower disc assembly 16 including slicing disc mower blades 18.

The mower disc assembly 16 includes a mower disc body 22. The mower disc body 22 defines a mounting location 19 which attaches to the rotary cutter bar 14 (see FIGS. 2-3) that is in turn driven by the drive unit 20. The drive unit 20 causes the mower disc assembly 16 to rotate about a mower disc body 22 that defines a central axis of rotation 24. The mower disc body 22 may include two blade mounting locations 21. Each blade mounting location 21 includes a first blade mounting location 23 and a second blade mounting location 25. In the embodiment shown in FIG. 4 the first and second blade mounting locations 23, 25 are apertures or boss structures through which fasteners 78 are inserted to mount blade 18. While two blade mounting locations 21 are illustrated it can be readily appreciated that only a single blade mounting location may be provided on the mower disc body 22 or more than two blade mounting locations 21 may be provide so long as the blade/blades 18 when mounted are balance during the rotation of the mower disc body 22.

As illustrated, the two blade mounting locations 21 are positioned toward a bottom of the mower disc body 22 so as to balance the blades 18 such that during rotation, the blades 18 will extend outwards beyond a mower disc body 22 outer periphery 26 under centrifugal force. Each blade 18 pivots about a blade body 66 axis of rotation 74. The pivoting motion is limited by a blade body retainer 58 that will be more fully described below. Accordingly, it is not the intent to limit the mounting location structures to apertures or bosses with bolts. Any suitable retainer structure to mount the blade 18 to the mower body 22 may be utilized provided the blade 18 may pivot outwards to extend beyond the mower body 22 outer periphery 26 under a centrifugal force generated by the mower disc body 22 in rotation.

As the mower disc assembly 16 is brought into contact with a crop 13 or foliage to be mowed, the cutter blades 18 will slicingly impact the crop or foliage and thereby slice an upper portion of the crop or foliage from its root system. This slicing of the crop will be more fully explained below.

Turning now to FIGS. 5, 6 and 7, respectively, a bottom view, side view and top view of a blade 18 for a mower disc body 22 are shown. The blade 18 may be stamped formed from sheet steel to include a blade body 66 of a hardness between HV 400 and 650 on Vickers scale. The blade body 66 has opposed top 62 and bottom 64 surfaces. An outer surface 60 extends around the blade body 66 vertically between the top 62 and bottom 64 surfaces. The blade body 66 includes a first 56 and second 58 aperture in spaced apart relation. A cutting edge 28 extends along an outermost periphery 29 of outer surface 60 of the blade 18. The outermost periphery 29 of outer surface 60 of the blade 18 may extend a distance L of typically between 5 and 50 centimeters and more preferably between 5 and 25 centimeters.

The first 56 aperture is a retainer structure that defines a blade body 66 axis of rotation 74 for pivoting movement. The second retainer structure 58 may be an elongated slot. The elongated slot 58 defines a first stop 68 and a second stop 70. The elongated slot 58 is adapted to limit the pivoting movement of the blade body 66 by way of its stops 68 and 70.

The top surface 62 of the blade 18 further includes a plurality of hardened beads 54 spaced apart and of a second hardness greater than the first hardness. The hardened beads 54 may comprise laser clad material deposited along an extension 72 extending radially inward towards the mower disc body 22 and perpendicular or within 45 degrees of perpendicular to a tangent 48 along the convex cutting edge 28.

The blade body 66 further includes a tapered cutting face 60 formed into the bottom surface and intersecting the cutting edge 28. The tapered cutting face 60 is sandwiched between the top surface 62 and the bottom surface 64 of the blade body 66 and extends radially inward from the top surface 62 to the bottom surface 64. The cutting edge 28 is formed along the top surface 62. The blade body 66 may be comprised of a sheet steel formed component of a material thickness 80 (see FIG. 8) that is substantially uniform. Typically, the blade material thickness 80 is between 3 mm and 6 mm. Thereby, the blade 18 dimensions make it particularly adapted for use as a mower blade. It may be readily appreciated that it is not the intent to limit construction of the blade body 66 only to sheet steel. Comparable materials such as cast steel and stainless steel may be utilized to form the blade body 66.

The hardened beads 54 have a thickness 82 and are 10 to 30 percent of the material thickness 80. The steel material hardness of the blade body 66 is between HV 400 and 650 in the Vickers Hardness Scale. The hardened beads 54 are harder in comparison to the steel blade material and can comprise at least one of the materials comprising tungsten carbide, chrome carbide, iron carbide, ceramic and other material having a Vickers Hardness Scale hardness between HV 700 to 1400. The hardened beads may be comprised of laser clad material deposited along a plurality of extensions 72 with each extension 72 spaced apart from the other extensions 72 and each extending transversely away from cutting edge 28 and radially inwards towards curved edge 32 of blade body 66. The benefit of this is to provide for a self-sharpening blade, that is as the softer blade body material wears away during use, the harder beads remain as the outermost periphery 29 of the blade 18 thereby providing for a serrated self-sharpened cutting edge 28.

Turning now to FIGS. 8 and 9, a top view of a mower disc 16 assembly and an elevated side view of the mower disc 16 assembly are illustrated.

A mower disc body 22 is adapted to rotate about a central axis 24. The mower disc body 22 includes an outer periphery 26. At least one blade 18 is mounted to the mower disc body 22 and extends radially outward from the outer periphery 26 of the mower disc body an X radial distance. The at least one blade 18 has a cutting edge 28 that extends along a length of a Y distance from a leading end 36 to a trailing end 38 of the cutting edge 28. The Y distance in a preferred embodiment the Y distance may be more than 1.5 times as great as the X radial distance. In a more preferred embodiment the Y distance may be two times as great as the X radial distance. In an even more preferred embodiment the Y distance may be 2.5 times as great as the X radial distance.

The functional benefit of the relationship between the X and Y distance is to provide a cutting edge 28 length beyond the mower disc body outer periphery 26 that facilitates the slicing action of the convex blade 18 as it moves through a crop 13.

In an embodiment the X distance will be between 5 and 15 centimeters. The Y distance will typically be between 5 and 50 centimeters and more preferably between 5 and 25 centimeters.

As illustrated, rotation about the central axis 24 of the mower disc body 22 is in a counterclockwise first direction 34. It can be readily appreciated in yet other embodiments the mower disc assembly 16 may very well be reoriented to rotate in a clockwise direction. Reference throughout the description is with respect to the mower disc assembly 16 adapted for counterclockwise rotation in first direction 34. However, the claims appended hereto are generic to both rotational directions.

The cutting edge 28 extends along a trailing path from a leading end or location 36 to a trailing end or location 38 relative to the central axis 24 in predetermined rotational movement defined by the mower disc body 22 when the blade 18 is mounted to the mower disc body 22. The leading location 36 and the trailing location 38 are separated in a preferred embodiment by an angular distance 44 of at least 120 degrees. In a more preferred embodiment the angular distance 44 is at least 30 degrees with the leading location and the trailing location separated between 5 and 25 centimeters.

In an embodiment the functional benefit of this may be to provide a cutting edge 28 length beyond the mower disc body outer periphery 26 that facilitates the slicing action of the convex blade 18 as it moves through a crop 13. The angular separation between the leading edge and the trailing end allow the crop to be sliced instead of impact cut as is the case with rectangular blades. The angular separation allows the crop 18 to slide along and remain in contact with the cutting edge 28 over a longer time and distance relative to a traditional rectangular blade impacting the crop along a limited surface of its blade. The slicing provided thereby increases blade 18 life because slicing produces less blade wear than an impact cut from a traditional rectangular blade, further such a blade 18 is more efficient in terms of harvesting the crop 13 and also demands less power to operate.

The cutting edge 28 includes a curved portion 46 that defines a tangent 48 that defines an acute angle 50 that is greater than 45 degrees with a radial extension 52 extending from the central axis. In that manner, the convex cutting edge 28 has an advantageous length that provides for the greatest amount of time and distance for the crop 13 to be sliced during operation.

The blade body 66 is connected to the mower disc body 22 at a hinge 56 that allows for articulating movement of the at least one blade 18. The blade body 66 is also connected to the mower disc body 22 at a slide retainer 58 at a location trailing the first hinge 56. The at least one blade 18 has an articulating movement limited by the slide retainer 58 between first stop 68 and second stop 70. Under centrifugal force generated by the mower disc boy 22 in rotation, the blade 18 is able to pivot about axis 74 until stopped by second stop 70 of the second hinge 58. Thus, the mower disc body 22 may rotate in a first direction 34 about the central axis of rotation 24 while the blade body 66 is simultaneously able to rotate about the blade body 66 axis of rotation 74 in a second and opposite direction of the first direction 34. The ability of the blade 18 to move in a direction opposite that of the mower body 22 together with beveled edge 60 provide the advantage of allowing the blade 18 to give way by rotating away from an obstruction and thereby prevent damage to the blade 18 if the instruction turned it out to be an immovable object. Further, this ability prevents such undesirable objects such as stones form being hurled into the air at tremendous velocities. Instead the blade 18 is able to pivot away from the object as the face 60 works to direct a downward force on the object further decreasing any projectile velocity.

When cutting crop with a knife blade, a slicing action rather than an impact/shearing action is more efficient. The way the slicing action in this embodiment is achieved is by facing the crop being cut with a cutting edge that has an oblique angle in relation to the rotating motion of the mower disc assembly into the crop being cut. Even more specifically this slicing action in this embodiment is achieved by facing the crop 13 being cut with a blade 18 that has the large convex cutting edge 28 over a radially inward tapered cutting face 60 where the taper extends radially inward from the top surface 62 to the bottom surface 64.

As the blade 18 is rotating, the stalks of the crop 13 come into contact with the convex cutting edge 28. The blade 18 begins to impact the stalk 13 and stalks 13 start sliding along the edge of the direction of least resistance. This happens in a matter of a very few milliseconds since the blade 18 is traveling at approximately 80 meters per second, but the effects of the sliding action are realized in the amount of energy used to sever the stalks is reduced.

The blade body 66 includes a leading hardened bead 76 and a plurality of trailing hardened beads 54. The trailing hardened beads 54 are located in series trailing the leading location 36. The laser clad hard metal beads 54 running tangent to the cutting edge 28 allow the cutting edge 28 to self-sharpen. That is, the blade body 66 of the first hardness wears at a much faster rate than the hardened metal beads 54 of the second hardness. Thus, as the softer material of the first hardness erodes radially inward the hardened beads 54 are left in place and create the desired self-sharpening effect of a serrated cutting edge 28.

Typically, a rectangular blade wears primarily at the corner of the outer leading edge of the blade. Further a conventional rectangular mower blade does not slice the crop as does the convex cutting edge 28, rather it impacts the crop to cut it. In this way, the typical rectangular blade quickly becomes dull and the cutting efficiencies continue to get worse until the blade is no longer useful. Thus, an advantage of the present embodiment is that the convex cutting edge 28 may provide four times the amount of cutting edge of a typical rectangular blade's cutting edge. Further, with the convex cutting edge 28 the cutting of the crop is distributed evenly along the entire length of the cutting edge 28 to provide an even wear pattern thus outlasting the conventional rectangular blade by approximately four times. Also, because the cutting of the crop 13 is evenly distributed along at the curved cutting edge 28, the cutting efficiencies will tend to remain the same from the start of the blade until it is completely worn out.

In an embodiment two blades 18 are mounted to the disc mower body 22 in diagonally opposed space relation. It can be readily appreciated the aforementioned mounting permits a balanced rotation of the mower disc body 22 about central axis 24. Accordingly, more or less blades 18 in yet other embodiments are envisioned. For example, an embodiment may have four blades 18 mounted to the mower disc body 22 provided they are opposed space relation and balanced when the mower disc body 22 is in rotation about central axis 24.

Turning now to FIGS. 10, 11 and 12, respectively, a bottom view, side view and top view of a blade 118 for a mower disc body 22 (FIG. 4) are shown. The blade 118 is similar in most respects to blade 18 (FIG. 5) previously discussed but differs in that graduated cutting teeth 184 are formed into the blade body 166 at the time the blade body 166 is formed which may be by stamping for a non-limiting example.

Thus, as with blade 18, blade 118 with its graduating cutting teeth 184 may be formed from sheet steel to include the blade body 166 of a hardness between HV 400 and 650 on Vickers scale. The blade body 166 has opposed top 162 and bottom 164 surfaces. An outer surface 160 extends around the blade body 166 vertically between the top 162 and bottom 164 surfaces. The blade body 166 includes a first 156 and second 158 aperture in spaced apart relation. A cutting edge 128 and extends along an outermost periphery 129 of outer surface 160 of the blade 118. The cutting edge 128 of outer surface 160 of the blade 118 may extend a distance L of typically between 5 and 50 centimeters and more preferably between 5 and 25 centimeters.

The blade body 166 may be comprised of a sheet steel formed component of a material thickness 180 that is substantially uniform. Typically, the blade material thickness 180 is between 3 mm and 6 mm. Thereby, the blade 118 dimensions make it particularly adapted for use as a mower blade. It may be readily appreciated that it is not the intent to limit construction of the blade body 166 only to sheet steel. Comparable materials such as cast steel and stainless steel may be utilized to form the blade body 166.

The blade body 166 includes a first 156 aperture that is a retainer structure that defines a blade body 166 axis of rotation 174 for pivoting movement. The second retainer structure 158 may be an elongated slot. The elongated slot 158 defines a first stop 168 and a second stop 170. The elongated slot 158 is adapted to limit the pivoting movement of the blade body 166 by way of its stops 168 and 170.

The top surface 162 of the blade 118 further includes a plurality of hardened beads 154 spaced apart and of a second hardness greater than the first hardness. The hardened beads 154 may comprise laser clad material deposited along an extension 172 extending radially inward towards the mower disc body 22 and perpendicular or within 45 degrees of perpendicular to a tangent 148 along the cutting edge 128. The hardened bead 154 has a maximum circumferential width 155 that extends along the cutting edge 128 of the top surface 162 of the blade body 166.

Unlike blade 18, here, the cutting edge 128 of the blade 118 includes the graduated cutting teeth 184. Thus the cutting edge 128 contains cutting segments 177 that break up the continuous cutting edge 128 of the previous embodiments discussed with respect to blade 18. Each tooth 184 is formed between each of the spaced hardened beads 154. Thus, the cutting edge 128 is comprised of a trailing edge portion 190, a center edge portion 194, and a leading edge portion 196. (FIG. 12). The leading edge portion may be free from any of the graduated cutting teeth 184 and extends along the outer surface 160 of the blade 118 a greater distance than any individual tooth of the graduated cutting teeth 184.

The trailing edge portion 190 and the leading edge portion 196 of the cutting edge 128 are similar in that each include a tapered cutting face 161 formed into the bottom surface 164 and intersecting the cutting edge 128. The tapered cutting face 161 is sandwiched between the top surface 162 and the bottom surface 164 of the blade body 166. The tapered cutting face 161 extends radially inward to the bottom surface 164 and forms in an embodiment an angle 163 between 30 and 60 degrees with the top surface 162 of the blade body 166. In a preferred embodiment the angle is between 30 and 45 degrees, and in a more preferred embodiment the angle is between 30 and 32 degrees. This same angle 163 is present in all the blade 18 embodiments heretofore described with respect to top surface 62 and cutting face 60, as cutting face 60 tapers radially inward to meet bottom surface 64 along the cutting edge 128.

The center edge portion 194 extends along the cutting edge 128 between the leading edge portion 196 and trailing edge portion 194 and comprises between 50 percent and 90 percent of the cutting edge 128 of blade 118.

The hardened beads 154 and the graduated cutting teeth 184 extend along the cutting edge 128 in the center edge portion 194 of the blade body 166. The center edge portion 194 in an embodiment may have 3 to 20 cutting teeth. In a preferred embodiment the center edge portion may have between 4 and 15 cutting teeth 184 and an even more preferred embodiment the center edge portion may have between 5 and 10 cutting teeth 184.

Turning now to FIGS. 13-14, each cutting tooth 184 of the center edge portion 194 is comprised of a tip face 186, a relief face 188 and a beveled cutting face 189.

The tip face 186 has a maximum beveled cutting face length 204 along top surface 162 that approximates a maximum circumferential length 155 of the hardened bead 154. The tip face 186 extends inward toward curved edge 132 and in a tapered fashion from the top surface 162 to the bottom surface 164 to form a tip face taper 212. The tip face taper 212 is intended to approximate the taper 161 of the leading edge portion and trailing edge portion of cutting edge 128.

The relief face 188 of the tooth 184 extends from approximately a tip face trailing edge 208 to an inward most beveled cutting face edge 210 of the beveled cutting face 189 and thereby providing a depth 187. Thus, the relief face 188 extends transversely and inwardly away from the outermost periphery 129 of the cutting edge 128. Typically the depth 187 is between 5 mm and 25 mm. In a preferred embodiment the depth is between 5 mm and 10 mm.

Further, the relief face 188 extends from the top surface 162 to the bottom surface 164. The relief face 188 and the beveled cutting face 189 meet to form and angle 202 between the two faces 188, 189 at the top surface 162 of the valve body 166. In an embodiment, the angle 202 may be between 60 and 120 degrees. In a preferred embodiment, the angle may be between 80 and 100 degrees. In a more preferred embodiment, the angle may be between 90 and 91 degrees. The relief face 188 and the beveled cutting edge face 189 are arranged to create a step 176.

The beveled cutting face 189 extends from a tip face trailing edge 206 to the inward most beveled cutting face edge 210 and thereby provides for a beveled cutting face length 191 of the beveled cutting face 189 extending along the top surface 162 of the blade body 166. The beveled cutting face length 191 along the top surface 162 is one of the cutting edge 128 segments 177 previously discussed. The beveled cutting face length 191 of each of the beveled cutting faces 189 gradually decrease, that is get shorter, with each tooth 184 the farther the graduated teeth 184 are from the leading end 136. (FIG. 12) The beveled cutting face 189 tapers radially inward from the top surface 162 to the bottom surface 164. The taper 210 of the beveled cutting face 189 may be obtained by sharpening on a machine such as a mill for example to provide a flat cutting edge and surface.

The hardened beads 154 have a thickness 182 and are 10 to 30 percent of the material thickness 180. The steel material hardness of the blade body 66 is between HV 400 and 650 in the Vickers Hardness Scale. The hardened beads 154 are harder in comparison to the steel blade material and can comprise at least one of the materials comprising tungsten carbide, chrome carbide, iron carbide, ceramic and other material having a Vickers Hardness Scale hardness between HV 700 to 1400. The hardened beads 154 may be comprised of laser clad material deposited along a plurality of extensions 172 with each extension 172 spaced apart from the other extensions 172 and each extending transversely away from cutting edge 128 and radially inwards towards curved edge 132 of blade body 166. The benefit of this is to provide self-sharpening for blade 118. That is, as the softer material of the blade body 166 wears away during use, the harder beads 154 remain to cut crop 13 (FIG. 1) and thereby improve the cutting action of the already serrated cutting edge 128. By such self-sharpening, the life of blade 118 is increased even more than that of the embodiments discussed with blade 18.

In addition to extending blade 118 life, other advantages of the cutting blade 118 with cutting teeth 184 include cutting crop 13 in nibbles, that is small bites, along the cutting edge 128. It can be readily appreciated that each tooth 184 provides for a slicing action in cutting crop 13 (FIG. 1) along the sharpened beveled cutting face 189 with length 191 that gets shorter and the relief face 18 that gets longer the farther the graduated cutting teeth are from the leading end 136. These graduated lengths provides optimal bites, that is cutting of the crop 13 in nibbles as crop 13 traverses the segmented central cutting edge portion 194. Further, advantage is found with this embodiment as just discussed with the self-sharpening of the blade 118 that is the result of the wearing away of the blade body 166 material that is softer than that of the hardened beads 154. Thus, the cutting efficiency and blade life are thereby extended by this particular blade body 118 with the cutting teeth 184 along the center edge portion 194 of the cutting edge 128.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A blade for a mower disc body that defines a central axis of rotation, the blade comprising:
    a blade body of a first hardness, the blade body having opposed top and bottom surfaces and comprising an outer surface extending around the blade body vertically between the top and bottom surfaces;
    wherein the blade body comprises first and second apertures or retainer structures in spaced apart relation; and
    a cutting edge extending along an outer surface of the blade,
    wherein the top surface comprises a plurality of hardened beads spaced apart and of a second hardness greater than the first hardness; the hardened beads comprise laser clad material deposited along an extension radially inward and perpendicular or within 45 degrees of perpendicular to a tangent along the convex cutting edge;

wherein the cutting edge comprises a leading edge portion, a center edge portion and a trailing edge portion; the center edge portion including graduated cutting teeth, wherein each graduated cutting tooth includes a tip face, a relief face and a beveled cutting face arranged to create a step in the cutting edge and thereby make the cutting edge discontinuous along the outer surface, the relief face extending transverse and inward away from an outermost periphery of the cutting edge to create the step, the tip face being at the outermost periphery of the cutting edge, the beveled cutting face extending transversely between the tip face and the relief face, each relief face extending from either the lead edge portion or one tip face of an upstream graduated cutting tooth, and wherein the graduating cutting teeth are located in the center edge portion, and the beveled cutting edges get shorter and the relief faces get longer the farther the graduated cutting teeth are from the leading portion.

2. A blade for a mower disc body, the blade comprising:
a blade body of a first hardness, the blade body having opposed top and bottom surfaces and comprising an outer surface extending around the blade body vertically between the top and bottom surfaces;
a first and a second blade body retainer;
a cutting edge extending along the outer surface of the blade; and
wherein the top surface comprises a plurality of hardened beads spaced apart and of a second hardness greater than the first hardness, the hardened beads arranged adjacent to the cutting edge and extending toward the outer surface,
wherein the cutting edge comprises a leading edge portion, a center edge portion and a trailing edge portion; the center edge portion including graduated cutting teeth,
wherein each graduated cutting tooth includes a tip face, a relief face and a beveled cutting face arranged to create a step in the cutting edge and thereby make the cutting edge discontinuous along the outer surface, the relief face extending transverse and inward away from an outermost periphery of the cutting edge to create the step, the tip face being at the outermost periphery of the cutting edge, the beveled cutting face extending transversely between the tip face and the relief face, each relief face extending from either the lead edge portion or one tip face of an upstream graduated cutting tooth,
wherein the graduating cutting teeth are located in the center edge portion, and the beveled cutting edges get shorter and the relief faces get longer the farther the graduated cutting teeth are from the leading portion.

\* \* \* \* \*